Aug. 14, 1951     G. W. BERRY     2,564,620
MILKING SYSTEM

Filed May 3, 1947                                    4 Sheets—Sheet 1

INVENTOR
*Geo. W. Berry*

BY     *Webster & Webster*
ATTORNEYS

Aug. 14, 1951  G. W. BERRY  2,564,620
MILKING SYSTEM

Filed May 3, 1947  4 Sheets-Sheet 2

INVENTOR
Geo. W. Berry

BY
ATTORNEYS

Aug. 14, 1951 G. W. BERRY 2,564,620
MILKING SYSTEM
Filed May 3, 1947 4 Sheets-Sheet 3

INVENTOR.
Geo. W. Berry
BY
ATTYS

Aug. 14, 1951   G. W. BERRY   2,564,620
MILKING SYSTEM
Filed May 3, 1947   4 Sheets-Sheet 4

INVENTOR
Geo. W. Berry
BY
ATTORNEYS

Patented Aug. 14, 1951

2,564,620

UNITED STATES PATENT OFFICE 2,564,620

MILKING SYSTEM

George W. Berry, Modesto, Calif.

Application May 3, 1947, Serial No. 745,884

5 Claims. (Cl. 119—14.06)

This invention is directed to, and it is an object to provide, an improved automatic milking system of the type wherein the milk from each milking or claw unit delivers through a piping system to a central receiving station.

Another object of the invention is to provide a novel receiver assembly at the central station, operative to automatically receive and discharge the milk, for subsequent processing, without interrupting the flow in the milk delivery line or breaking the suction in the vacuum line.

A further object of the invention is to provide an automatic milking system wherein the receiver assembly, as above, includes a pair of milk containers or receivers adapted for alternate operation; there being a novel control mechanism arranged to alternately connect the receivers to the milk and vacuum lines, so that the other receiver may then be emptied without in any way disturbing continued functioning of the system.

An additional object of the invention is to provide a receiver assembly, as in the preceding paragraph, wherein each receiver is mounted for downward yielding under the weight of a predetermined volume of milk therein; the alternating control mechanism being electrically actuated and including a circuit having reversing switches responsive to such downward yielding of each receiver.

It is also an object to provide a milking system wherein the receiver assembly at the central station is simple, compact, smooth operating, and requires a minimum of maintenance and repair.

A further object of the invention is to provide a practical and convenient milking system, and one which will be exceedingly effective for the purpose for which it is designed.

These objects are accomplished by means of such structure and relative arrangement of parts as will fully appear by a perusal of the following specification and claims.

Referring now more particularly to the characters of reference on the drawings, the milking system is of the automatic type, including a vacuum line 1 and a milk line 2 which extend through the milking parlor, and at each stall a vacuum hose 3 and a milk hose 4 lead from the vacuum line 1 and milk line 2, respectively, to a milking claw 5 of generally conventional construction.

Figure 1:
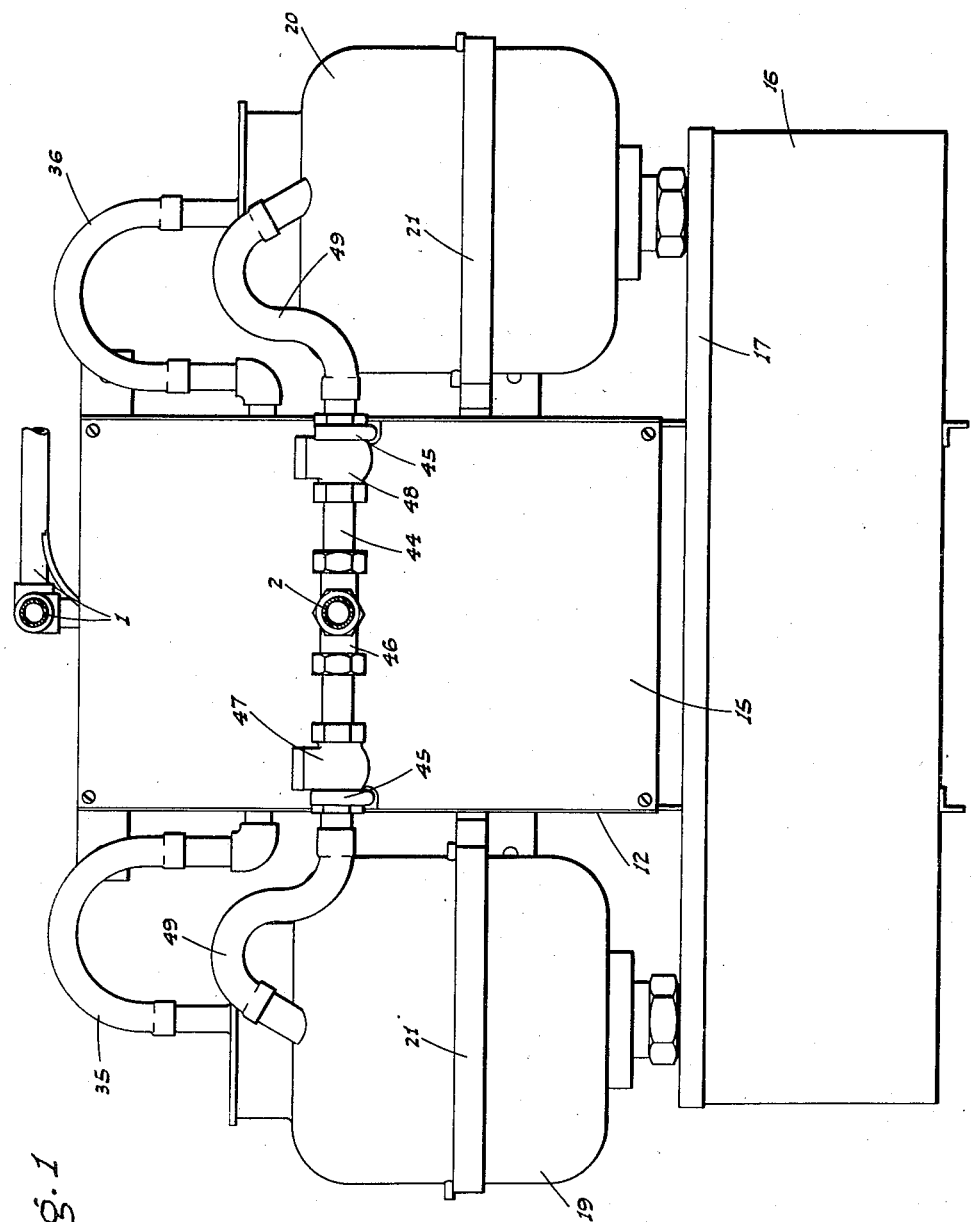
Fig. 1 is a front elevation of the receiver assembly at the central station.
Figure 2:
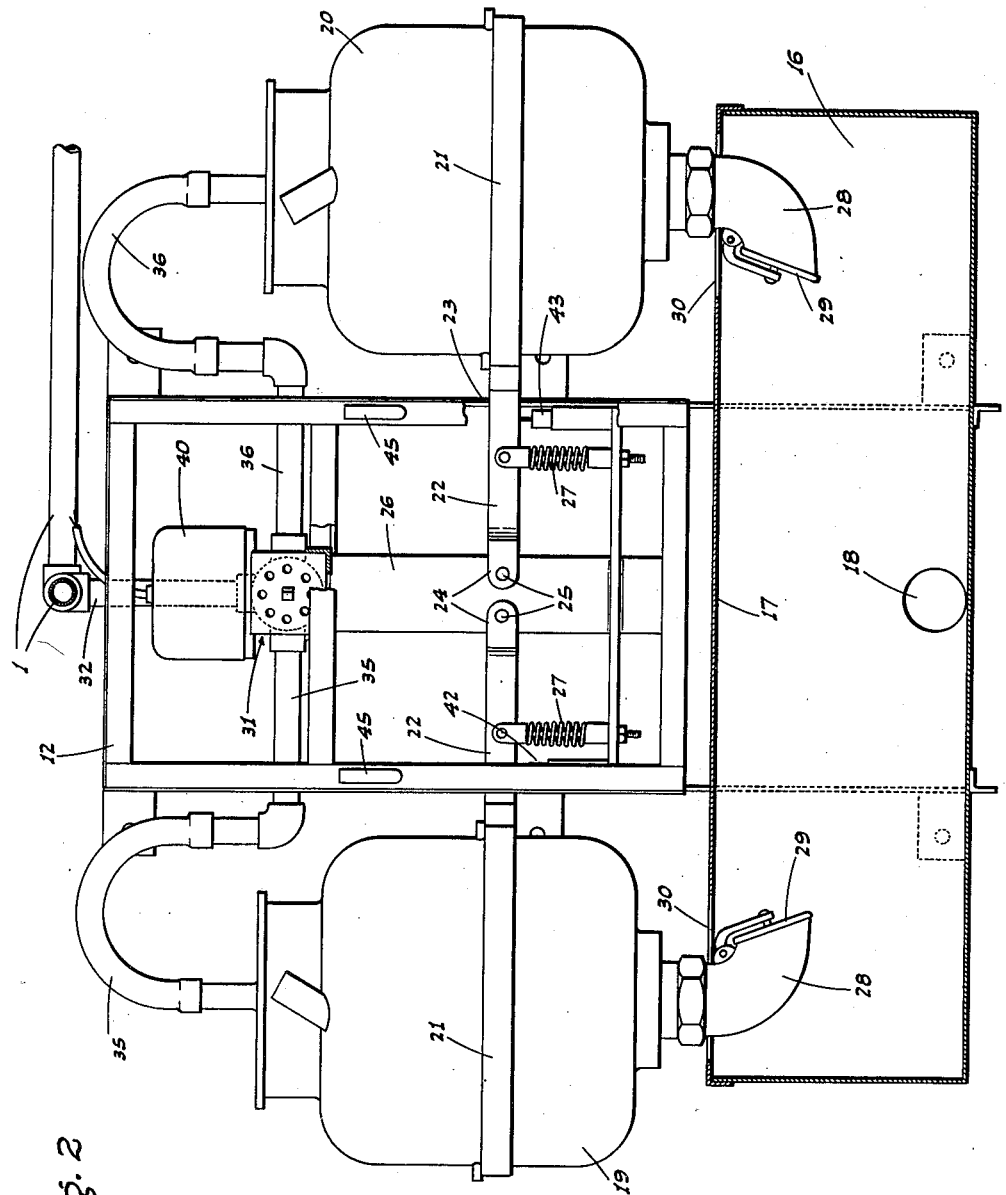
Fig. 2 is a similar view, but with the front plate of the housing removed and the tank in section.
Figure 3:
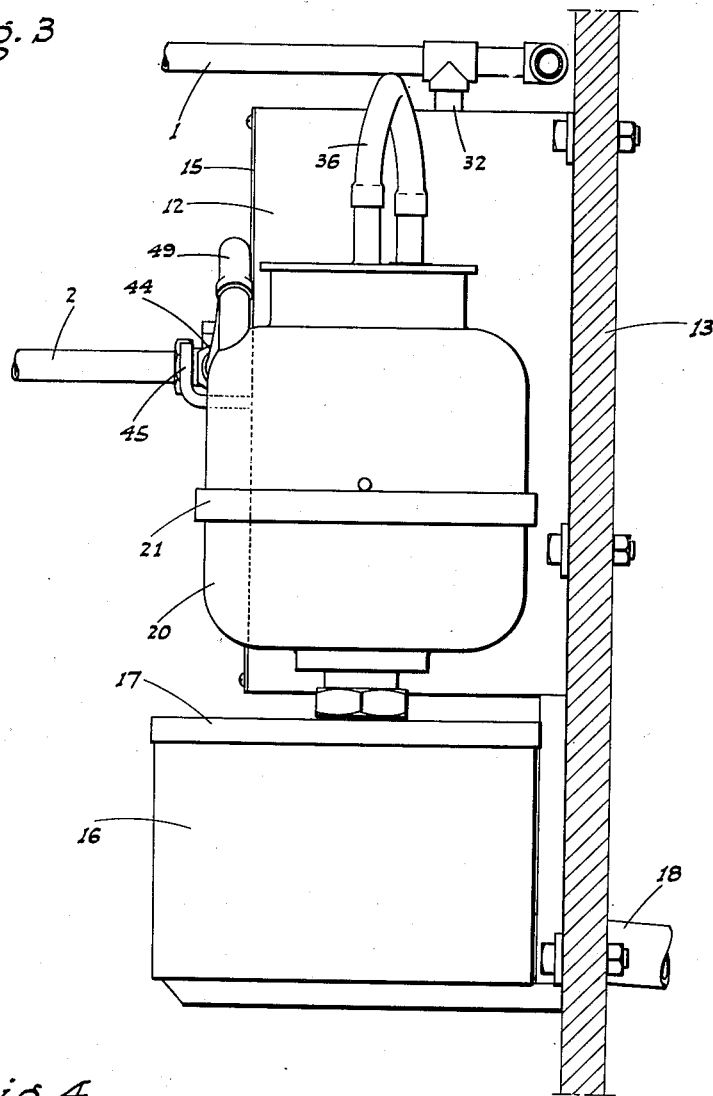
Fig. 3 is a side elevation of the receiver assembly at the central station.
Figure 4:
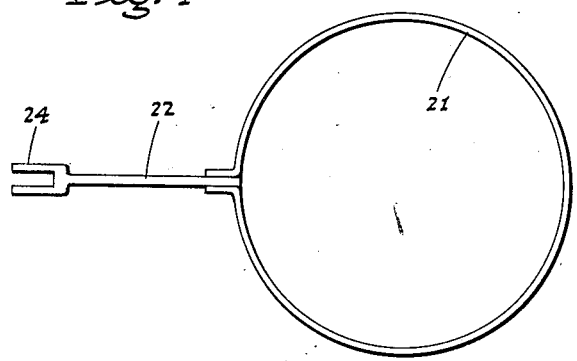
Fig. 4 is a plan view of one of the receiver supporting scale beams.
Figure 5:
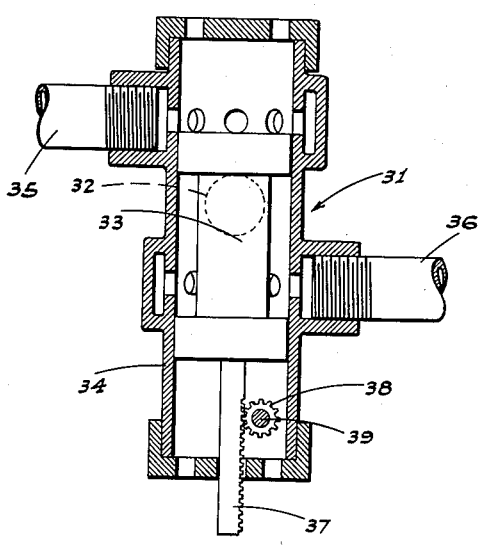
Fig. 5 is an enlarged fragmentary sectional plan of the four-way valve employed to alternate the receiver assembly.
Figure 6:
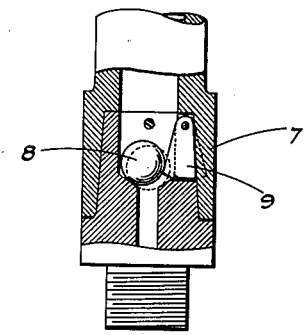
Fig. 6 is an enlarged fragmentary sectional elevation of the check valve fitting employed between the vacuum line and each pulsator unit.
Figure 7:
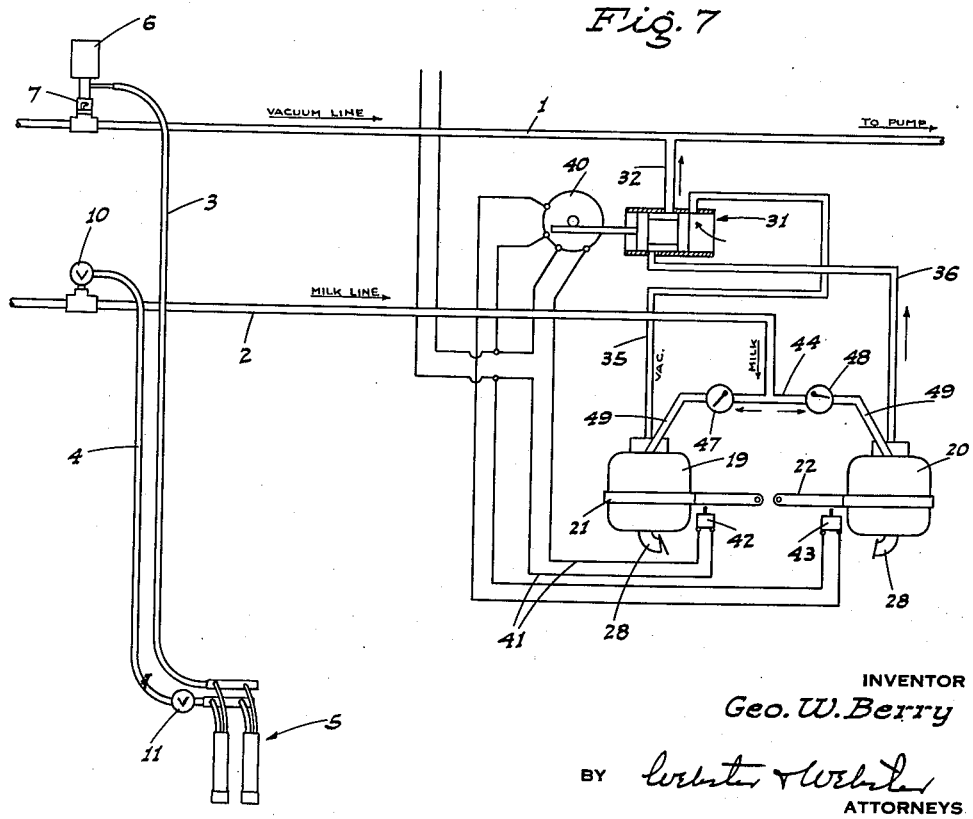
Fig. 7 is a diagram of the system.

A pulsator unit 6 is interposed between the vacuum line 1 and each vacuum hose 3 by means of a detachable, two-part fitting 7. Each fitting 7, as shown in detail in Fig. 6, includes a ball check valve 8 normally held open by a pivoted trigger 9 when the parts of the fitting are engaged. However, when the parts of the fitting are disengaged for removal of the pulsator unit 6, the trigger 9 swings outwardly and the ball check valve 8 seats, thereby preventing undesired air entry into the vacuum line.

A hand valve 10 is interposed between each milk hose 4 and milk line 2 adjacent the latter, while a separate hand valve 11 is interposed in each milk hose 4 adjacent the claw 5. Thus, the operator can shut off the milk flow from each claw 5 at selective points, as convenience may dictate.

At a central station in the milking system a novel, alternating receiver assembly is provided, and comprises the following:

An upstanding housing, indicated generally at 12, is mounted in fixed position on a back wall 13; such housing including opposite side plates 14 and a removable front plate 15.

Below the housing 12 the back wall 13 supports a horizontally elongated tank 16 of a length such that it projects equally a substantial distance beyond each side of the housing 12. This tank 16 includes a removable cover 17, and the tank is adapted to deliver to the milk cooling unit (not shown) of the milking system through a discharge port 18.

On opposite sides of the housing 12, and directly above opposite end portions of the tank 16, there is provided a milk receiver; these receivers being indicated at 19 and 20.

Each of the receivers 19 and 20 is removably supported in a horizontal ring 21 of a scale beam 22 which projects inwardly through a slot 23 in the adjacent side plate 14 of the housing 12. Within the housing 12, and at its inner end, each scale beam 22 includes a clevis 24 pivoted, as at 25, to an upstanding center post 26 for vertical swinging motion of said scale beam 22 and the corresponding ring 21; downward motion of each scale beam 22, from a raised position, being resisted by a compression spring unit 27 cooperating with the scale beam within the housing. The spring units 27 are of such strength that they maintain the receivers 19 and 20 normally in raised position; such receivers lowering, to the limit of their travel as regulated by the slots 23, only under the influence of a predetermined volume of milk therein.

Each of the receivers 19 and 20 is fitted, at its lower end, with a spill valve 28, including a trap 29 normally closed in response to vacuum in the receiver. The spill valves 28 depend through openings 30 in the cover 17 of the tank 16, so that when said spill valves 28 open, upon breaking of vacuum in the corresponding receivers, in the manner hereinafter described, the same dump into the tank 16.

At the central station the vacuum line 1 is connected in communication with a four-way valve 31 by means of a conduit 32; such four-way valve being fixedly mounted in the housing 12 and including a valve piston 33 movable in a ported cylinder 34 to establish communication alternately between the vacuum conduit 32 and other flexible conduits 35 and 36, which lead to the receivers 19 and 20, respectively. When the valve 31 establishes communication between conduit 32, and either of the conduits 35 or 36, the other of the latter opens to atmosphere, breaking the vacuum previously existent in the corresponding one of the receivers.

The piston 33 of the four-way valve 31 is arranged to be reciprocated between its alternate positions by means of an axial rack 37 driven by a pinion 38 on the shaft 39 of a reversible electric motor 40. Thus, when the reversible electric motor 40 is run in one direction, the four-way valve 31 establishes communication between the vacuum conduit 32 and the conduit 35 which leads to the receiver 19; the conduit 36 then being open to atmosphere at the valve. When the reversible electric motor is run in the opposite direction, the vacuum conduit 32 communicates with the conduit 36 to establish vacuum in the receiver 20; the conduit 35 then being open to atmosphere at the valve, breaking the vacuum in the receiver 19.

The electric motor 40 is reversed, and the vacuum in the receivers 19 and 20 alternately broken, as above explained, through the medium of a reversing circuit, indicated generally at 41, which includes a pair of reversing switches 42 and 43 interposed therein. The reversing switches 42 and 43 are mounted in the housing 12 directly below the scale beams 22 corresponding to the receivers 19 and 20, respectively. Thus, when the receiver 19 has a predetermined volume of milk delivered thereto, in the manner hereinafter described, such receiver lowers, and the resulting downward movement of the scale beam 22 causes the latter to engage and actuate the reversing switch 42. When this happens the four-way valve 31 is shifted to a position to open conduit 35 to atmosphere and to establish communication between vacuum conduit 32 and conduit 36, whereupon vacuum is established in the receiver 20. As the vacuum breaks in receiver 19, the trap 29 of the corresponding spill valve 28 opens, and the milk from said receiver 19 flows downwardly into the tank 16, and then said receiver raises, by its spring unit 27, to starting position.

In this manner the receivers 19 alternate between a raised milk receiving position, and a lowered milk discharging position; one such receiver thus always being operative to receive milk from the milk line 2 in the manner now described in detail:

At the central station, and in front of the housing 12, the receiver assembly includes a transverse manifold 44 removably suspended on hooks 45, whereby said manifold may be detached for cleaning and sterilization.

The milk line 2 connects into the manifold 44 centrally of its ends by a detachable fitting 46, and on opposite sides of said fitting 46 the manifold includes check valves 47 and 48 which close toward each other, i. e. toward the fitting 46 or milk line 2.

At opposite ends the manifold 44 includes flexible conduit legs 49 which connect, respectively, into the receivers 19 and 20 adjacent but short of the top of the same.

The milk from each claw 5 flows through the milk hose 4 to the milk line 2, and is thence conveyed to the manifold 44. From such manifold 44, the milk is delivered alternately to the receiver 19 and receiver 20 as the vacuum is alternately established in the same in the manner previously described. It is the vacuum from the receivers, depending on which one is in communication with the manifold, which imposes the vacuum on said manifold, and milk line 2, to cause milk flow through the same toward such receiver.

When the receiver 19 is in raised milk receiving position, with vacuum established in said receiver, the check valve 47 is open; the milk then flowing from the manifold 44, through the corresponding conduit leg 49 into said receiver 19. At this time the check valve 48 is closed by reason of the vacuum imposed thereon from the receiver 19. When the receiver 19 is filled with the predetermined volume of milk, the corresponding scale beam 22 lowers, reversing switch 42 is actuated, and the motor 40 shifts the four-way valve 31 to the position wherein vacuum is established in receiver 20 and broken in receiver 19, for dumping of the latter. When this occurs the check valves 47 and 48 reverse their positions, and the milk from line 2 then flows from the manifold 44, through the corresponding conduit leg 49 into the receiver 20.

In the above described manner the receiver assembly is operative to continuously receive milk from the line 2 without interrupting such flow or breaking the vacuum in the line 1, either of which would be undesirable in an automatic milking system of the type described.

The automatic and alternate operation of the receivers 19 and 20, in the manner described, makes possible this continuity of operation so essential to the effective functioning of the milking system.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A continuous milk delivery system comprising a milk flow line and a separate vacuum line, a support, a pair of spaced scale beams mounted on the support for independent vertical motion, springs yieldably resisting such motion, a milk receiver mounted on each scale beam, each receiver and corresponding scale beam being downwardly yieldable under predetermined milk load in said receiver, a suction conduit leading from each receiver, a reversible valve operative to alternately connect one suction conduit to the vacuum line and to open the other to atmosphere, an electro-actuator connecting in operative reversing relation to the valve, a reversing circuit for the electro-actuator, a pair of reversing switches in the circuit, each switch corresponding to one scale beam and positioned to be actuated by the latter upon downward yielding thereof, a milk conduit leading from each receiver, and means to establish communication of each milk conduit with the milk line only when the corresponding suction conduit is connected to the vacuum line.

2. A continuous milk delivery system comprising a milk flow line and a separate vacuum line, a support, a pair of spaced scale beams mounted on the support for independent vertical motion, springs yieldably resisting such motion, a milk receiver mounted on each scale beam, each receiver and corresponding scale beam being downwardly yieldable under predetermined milk load in said receiver, a suction conduit leading from each receiver, a reversible valve operative to alternately connect one suction conduit to the vacuum line and to open the other to atmosphere, an electro-actuator connecting in operative reversing relation to the valve, a reversing circuit for the electro-actuator, a pair of reversing switches in the circuit, each switch corresponding to one scale beam and positioned to be actuated by the latter upon downward yielding thereof, a milk conduit leading from each receiver, and means to establish communication of each milk conduit with the milk line only when the corresponding suction conduit is connected to the vacuum line; said last named means including a check valve between each milk conduit and the milk line, said check valves being arranged so that each is responsive to, and opened by, vacuum in the corresponding receiver, the vacuum in one receiver causing closing of the check valve corresponding to the other receiver.

3. A continuous milk delivery system comprising a milk flow line and a separate vacuum line, a support, a pair of spaced scale beams mounted on the support for independent vertical motion, springs yieldably resisting such motion, a milk receiver mounted on each scale beam, each receiver and corresponding scale beam being downwardly yieldable under predetermined milk load in said receiver, a suction conduit leading from each receiver, a reversible valve operative to alternately connect one suction conduit to the vacuum line and to open the other to atmosphere, an electro-actuator connecting in operative reversing relation to the valve, a reversing circuit for the electro-actuator, a pair of reversing switches in the circuit, each switch corresponding to one scale beam and positioned to be actuated by the latter upon downward yielding thereof, a milk conduit leading from each receiver, a manifold in communication at one point with the milk line, the milk conduit leading from each receiver to connect with the manifold on opposite sides of said one point, and check valves in the manifold between each milk conduit and said one point, the check valves opening toward corresponding receivers.

4. A continuous milk delivery system comprising a milk flow line and a separate vacuum line, a pair of milk receiving receivers, a milk inlet conduit leading from the milk flow line into each receiver, a check valve in each inlet conduit, such valves closing in the direction of the milk flow line and opening in the direction of the corresponding receiver, a four way valve interposed in the vacuum line, a conduit leading from each receiver to said valve and said valve being operative to establish communication alternately between each last named conduit, the vacuum line, and atmosphere; each can being mounted for downward movement and being normally yieldably held against such movement, a reversible motor connected with said valve and effective to operate the valve, a reversing circuit connected with the motor and including a pair of reversing switches, each switch being disposed adjacent one of the receivers, means on each receiver effective to operate the adjacent switch upon a predetermined downward movement of such receiver, and valve means for releasing the milk from the respective receivers when the latter are under atmospheric pressure.

5. A continuous milk delivery system comprising a milk flow line and a separate vacuum line, a pair of milk receivers of enclosed vacuum filling atmospheric pressure discharge type, a weight resisting scale beam supporting each receiver for downward yeilding movement under a predetermined milk load therein, a pair of conduits leading from each receiver, one conduit of each pair being adapted to be connected to the vacuum line or to atmosphere and the other conduit of the pair being adapted to be connected to the milk line, and means responsive to downward yielding movement of the scale beams operative to automatically and alternately connect one conduit of one pair to the vacuum line and the other conduit of such pair to the milk line and to open one conduit of the other pair to atmosphere and to close the other conduit of such other pair from connection with the milk line; the last named means including a reversible valve interposed between the vacuum line and the conduits adapted to be connected with such vacuum line, an electro-actuator connected with the reversible valve in operative relation thereto, a reversing electric circuit for said actuator, a reversing switch in the circuit adjacent each scale beam, and means between each beam and its adjacent switch effective to operate the switch upon lowering of the beam.

GEORGE W. BERRY.

REFERENCES CITED

The following references are of record in the file of this patent:

UNITED STATES PATENTS

| Number | Name | Date |
| --- | --- | --- |
| 950,385 | Gane | Feb. 22, 1910 |
| 1,813,238 | Hapgood | July 7, 1931 |
| 1,846,805 | Hapgood | Feb. 23, 1932 |
| 1,962,192 | Hapgood | June 12, 1934 |
| 2,009,400 | Hapgood | July 30, 1935 |